United States Patent
Batut et al.

[19]

[11] Patent Number: 6,130,409

[45] Date of Patent: Oct. 10, 2000

[54] CIGAR LIGHTER WITH A SAFETY BLADE TERMINAL, IN PARTICULAR FOR MOTOR VEHICLE

[75] Inventors: Pierre Henry Batut, Ausillon; Gérard Texier, Bobigny, both of France

[73] Assignee: Valeo Vision, Bobigny, France

[21] Appl. No.: 09/403,915

[22] PCT Filed: Feb. 26, 1999

[86] PCT No.: PCT/FR99/00442

§ 371 Date: Oct. 27, 1999

§ 102(e) Date: Oct. 27, 1999

[87] PCT Pub. No.: WO99/43511

PCT Pub. Date: Sep. 2, 1999

[30] Foreign Application Priority Data

Feb. 27, 1998 [FR] France .................................. 98 02388

[51] Int. Cl.$^7$ ....................................................... B60N 3/14
[52] U.S. Cl. .............................................................. 219/265
[58] Field of Search .................................... 219/265, 270, 219/267; 361/264–266; 123/145 A

[56] References Cited

U.S. PATENT DOCUMENTS

| | | | |
|---|---|---|---|
| 3,560,705 | 2/1971 | Mendenhall | 219/265 |
| 4,190,763 | 2/1980 | Seibel et al. | 219/265 |
| 4,236,061 | 11/1980 | Fenn et al. | 219/265 |
| 4,449,036 | 5/1984 | Seibel et al. | 219/265 |
| 4,650,962 | 3/1987 | Pramaggiore | 219/264 |
| 5,233,162 | 8/1993 | Gaisberg et al. | 219/265 |
| 5,493,098 | 2/1996 | Diederich | 219/265 |
| 5,932,126 | 8/1999 | Thivet | 219/265 |
| 5,998,763 | 12/1999 | Mattis et al. | 219/265 |

FOREIGN PATENT DOCUMENTS

| | | |
|---|---|---|
| 111282 | 6/1984 | European Pat. Off. . |
| 2487271 | 1/1982 | France . |

*Primary Examiner*—John A. Jeffery
*Attorney, Agent, or Firm*—Morgan & Finnegan, L.L.P.

[57] ABSTRACT

The invention relates to a cigar lighter, comprising a removable heating plug and a lighting body including a lighting socket in which the heating plug is accommodated along an assembly direction and the bottom of which carries a bimetallic strip with electrical insulation. A potential difference exists between the socket and the bimetallic strip for supplying electrical power to the heating plug. The cigar lighter includes a safety blade terminal in electrical contact with the bimetallic strip, and able to be linked electrically to the socket in the event of overheating.

10 Claims, 3 Drawing Sheets

CIGAR LIGHTER WITH A SAFETY BLADE TERMINAL, IN PARTICULAR FOR MOTOR VEHICLE

BACKGROUND OF THE INVENTION

The present invention relates to a cigar lighter with a safety blade terminal, particularly for motor vehicles.

Such a cigar lighter is described in the French patent application published under number U.S. Pat. No. 5,932, 126. It conventionally comprises a removable heating plug and a lighting body which accommodates the heating plug in a socket along an assembly direction. The bottom of the socket carries a bimetallic strip, with electrical insulation. A potential difference is created between the bimetallic strip and the socket for supplying electrical power to the heating plug.

The socket carries a safety blade terminal (more precisely, a safety bimetallic strip in U.S. Pat. No. 5,932,126, in electrical contact with the bimetallic strip, which is able to come into contact with a tag linked electrically with the socket in the event of inadvertent overheating in normal operation. In the event of overheating, the safety blade terminal is thus linked electrically to the socket which causes a short circuit which entails blowing of the fuse provided in the vehicle in the power supply circuit of the cigar lighter.

Thus effective protection is achieved against overheating which does not require the cigar lighter to be dismantled in order to re-establish operation thereof, since it is sufficient to change the fuse corresponding to the power supply circuit of the cigar lighter.

BRIEF SUMMARY OF THE INVENTION

The invention aims to improve cigar lighters of this type, particularly by reducing their axial bulk along the assembly direction, while further protecting the safety blade terminal from external attacks which it might suffer (dust, ashes, mechanical damage, etc.).

In order to do this, the invention proposes a cigar lighter of the above-described type, characterised in that it comprises a safety contact accommodated in the socket and which extends essentially transversely to the assembly direction, in that the safety contact and the bottom of the socket define a safety space between them, along the assembly direction, and in that the safety blade terminal extends into the safety space essentially transversely to the assembly direction.

Advantageously, the safety contact is in electrical contact with the bimetallic strip;

the safety blade terminal is produced in one piece with the bimetallic strip;

a bimetallic strip holder is interposed between the bottom of the socket and the bimetallic strip, the bimetallic strip holder exhibits at least one hollow space which opens out into the face of the bimetallic strip holder turned towards the bottom of the socket and the safety blade terminal is accommodated in the hollow space;

the bimetallic strip holder includes, in its face opposite the bottom of the socket, at least one countersink in which the safety contact is accommodated;

the hollow space opens out into the countersink through an orifice and the said orifice is masked by the safety contact;

the safety contact bears on the bimetallic strip holder along the three axes;

the safety contact is mounted in the lighting body by means of a fixing element which also makes it possible to fix the bimetallic strip, the safety blade terminal and the bimetallic strip holder onto the socket;

the cigar lighter comprises two symmetric safety blade terminals;

the safety blade terminal is linked to the bimetallic strip by a portion directed along the assembly direction.

BRIEF DESCRIPTION OF THE DRAWINGS

An exemplary embodiment of the invention will now be described by reference to the attached drawings in which.

DETAILED DESCRIPTION OF THE INVENTION

Figure 1:
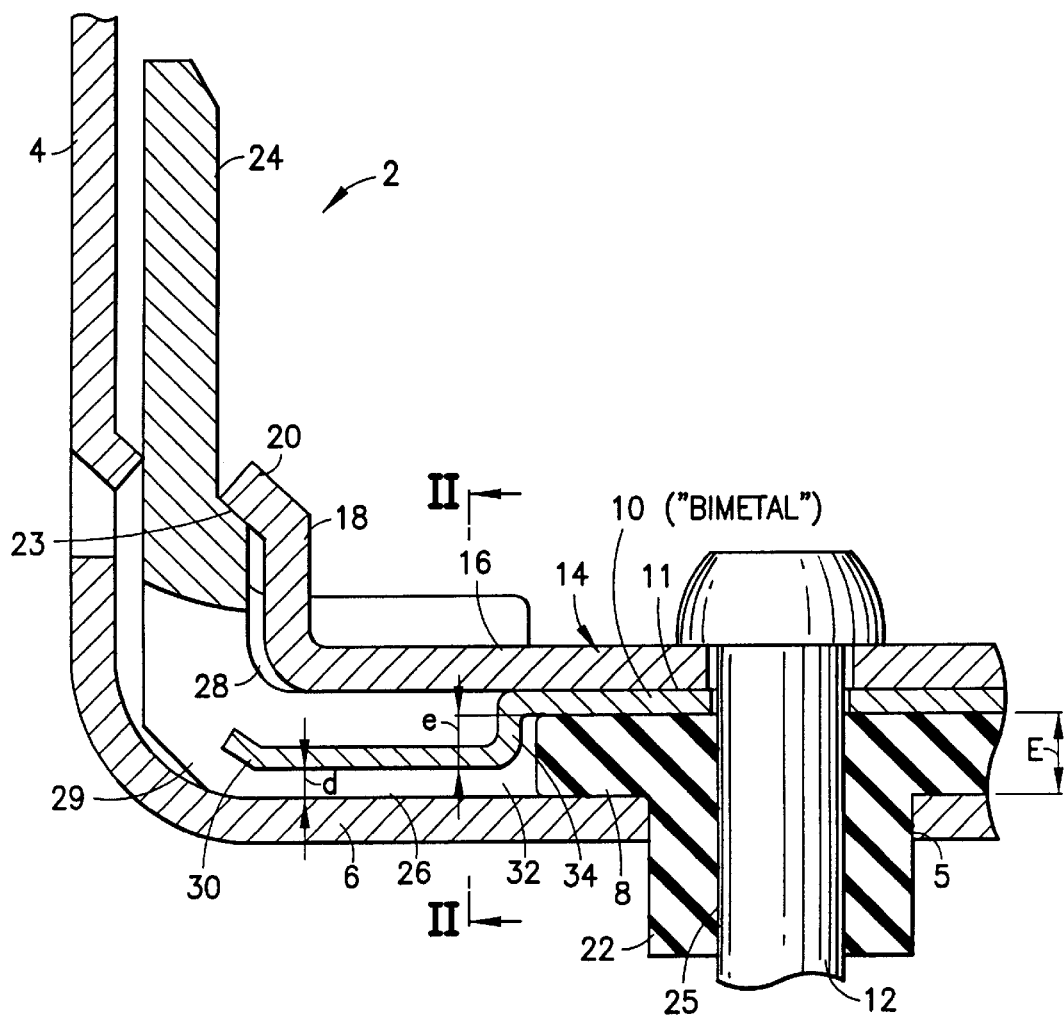
FIG. 1 represents a sectional view of a part of a cigar lighter in accordance with the teachings of the invention.
Figure 2:
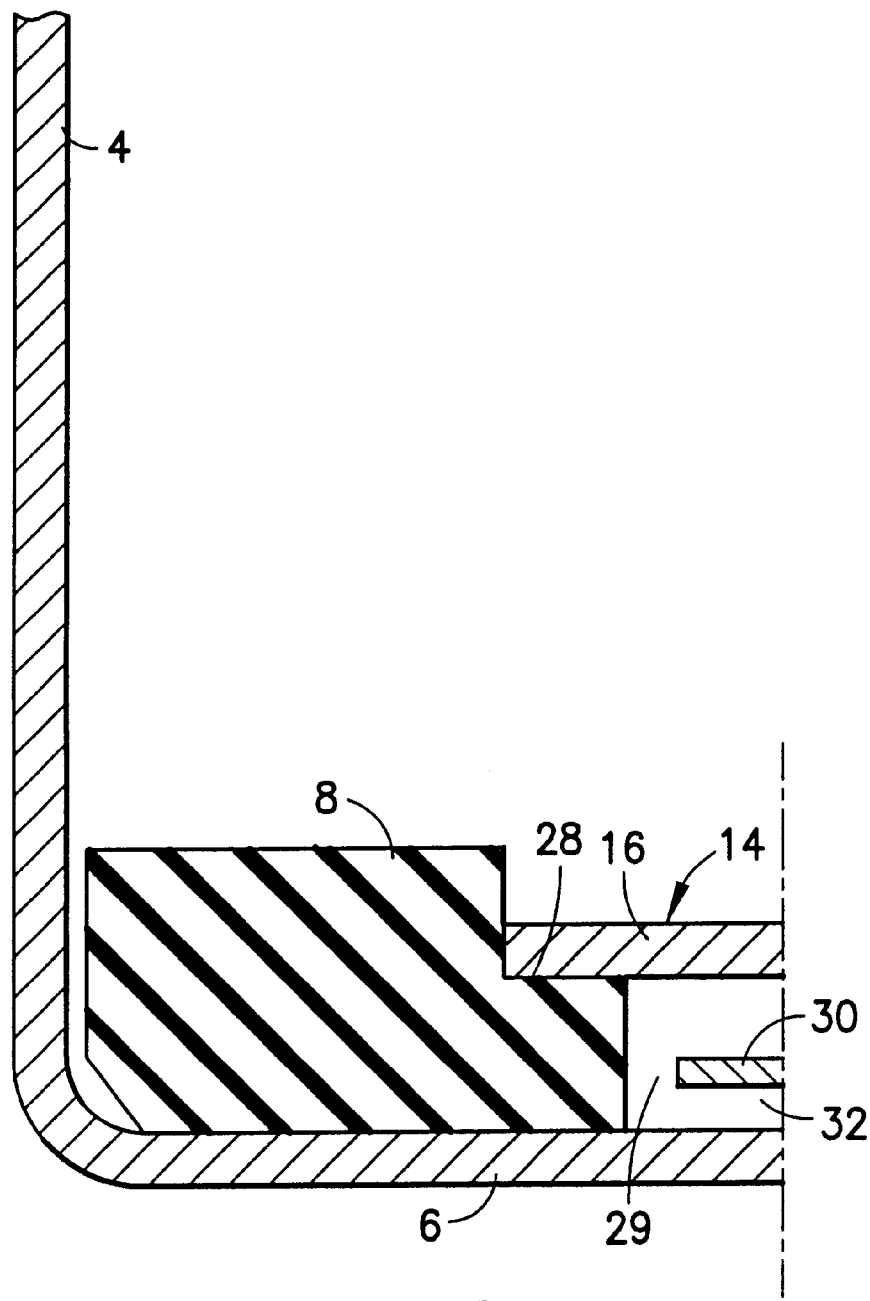
FIG. 2 is the section along the line II—II of FIG. 1.

The cigar lighter, part of which is represented in FIG. 1, conventionally comprises a removable heating plug and a lighting body 2 which accommodates the heating plug in a socket 4 along an assembly direction. The bottom 6 of the socket 4 internally carries a bimetallic strip 10, with electrical insulation.

According to a conventional design, set out for example in the document U.S. Pat. No. 5,932,126 to which reference may be made for further details, the heating plug comprises a heating cup, in engagement in the bimetallic strip 10 during the phases of heating and spaced away from the bimetallic strip 10 by return means such as a spring outside the heating phases.

Figure 3:
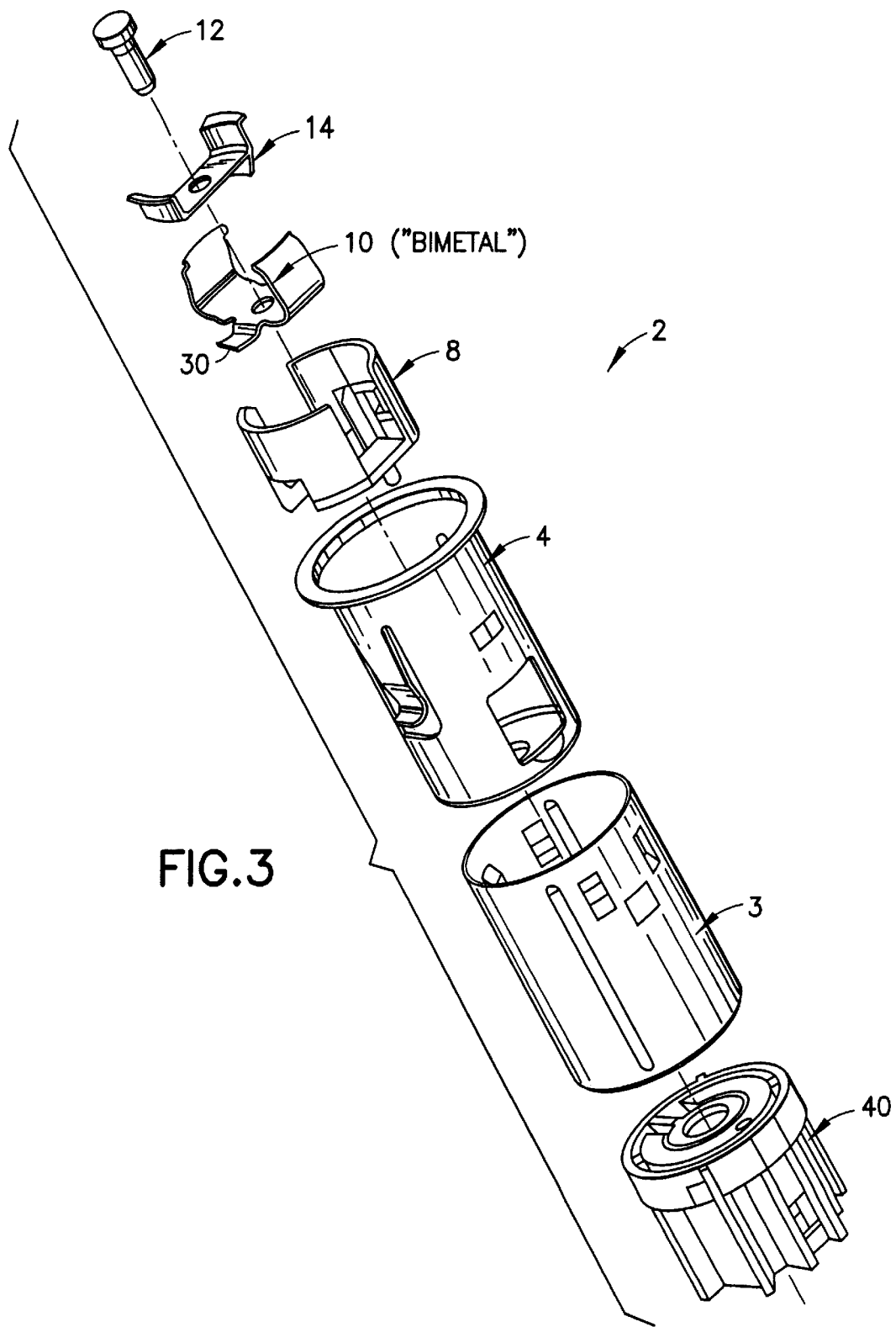
FIG. 3 is an exploded view of the lighting body of a cigar lighter in accordance with the teachings of the invention.

As represented in FIG. 3, the cigar lighter body 2 comprises a thermal screen or masking socket 3 which accommodates the socket 4, as described in the French patent application FR 2 730 679.

An electrical insulation component 8, called bimetallic strip holder and generally produced from thermoset, is interposed between the bimetallic strip 10 and the bottom of the socket 6. The socket 4, the bimetallic strip holder 8 and the bimetallic strip 10 are joined together by a fixing element 12, in this case a screw arranged axially along the assembly direction. This fixing element 12 generally also makes it possible to fix two electrical power supply components of the connector 40, one of which is linked electrically to the socket 4, the other to the bimetallic strip 10, power supply components between which is applied a potential difference existing between two cables of the electrical power supply circuit of the vehicle. The fixing element 12 is in electrical contact with the bimetallic strip 10 and electrically insulated from the socket 4 by means of the bimetallic strip holder 8.

In the lighting body, there thus exists a potential difference between the bimetallic strip 10 and the socket 4, which is transmitted by contact to the heating plug and applied to a heating resistance element of the heating plug.

The cigar lighter according to the invention includes a safety contact 14 made of conducting material. This safety contact 14 is mounted in the bottom 6 of the socket 4, in contact with the bimetallic strip 10, preferably in contact with the face 11 of the bimetallic strip opposite the bimetallic strip holder. Like the bimetallic strip 10, the safety contact 14 is fixed onto the socket 4 by means of the above-mentioned fixing element 12.

The main (central) part 16 of the safety contact 14 extends transversely to the assembly direction, preferably at a right angle from the central part of the bimetallic strip 10.

The safety contact 14 further includes two end parts 18 which extend essentially along the assembly direction and are directed away from the bottom 6 of the socket 4. The end parts 18 are produced by folding, for example.

The end parts 18 of the safety contact 14 are terminated in ends which extend at 45° towards the side walls of the socket 4 and away from the bottom 6 of the socket.

The bimetallic strip holder 8 is a component of complex shape. In section in a plane containing the assembly direction and extending along the principal direction of the safety contact 14, the bimetallic strip holder 8 essentially forms a U the concavity of which is turned away from the bottom 6 of the socket and the branches 24 of which are essentially parallel to the side walls of the socket 4.

The bottom 26 of the bimetallic strip holder 8 extends parallel to the bottom 5 of the socket and is in contact with it. The bottom 26 of the bimetallic strip holder 8 includes an appendage 22 which extends along the assembly direction through an orifice 5 formed in the bottom 6 of the socket for the fixing element 12 to pass. The bimetallic strip holder itself includes a through bore 25, produced along the assembly direction, which accommodates the fixing element 12. The bimetallic strip holder, particularly in the region of the appendage, provides the electrical insulation between the fixing element 12 (linked electrically to the bimetallic strip 10) and the socket 4.

The bottom 26 of the bimetallic strip holder includes, on its face turned away from the bottom 6 of the socket, countersinks 28 in which is accommodated the main part 16 of the safety contact 14. These countersinks allow an adjustment of the position of the safety contact 14 with respect to the bimetallic strip holder 8 along a direction perpendicular to the assembly direction and to the main direction of the safety contact 14.

In their lower part, the branches 24 of the bimetallic strip holder each form a bearing area 23 on which the corresponding end 20 of the safety contact 14, produced at 450 as seen above, comes into abutment. The safety contact 14 therefore bears on the bimetallic strip holder along the three axes.

The bimetallic strip holder 8 also exhibits hollow spaces 29 in the lateral parts of its bottom 26 which open out into the face of the bimetallic strip which is turned towards the bottom 6 of the socket 4. The hollow spaces 29 extend along the main direction of the safety contact 14. Perpendicularly to this same direction and to the assembly direction, the hollow spaces 29 are narrower than the safety contact 14. The hollow spaces 29 open out into the countersinks 28 which accommodate the safety contact 14 in the region of orifices which are masked, by construction, by the safety contact 14.

The hollow spaces 29 form a safety space 32 along the assembly direction between the safety contact 14 and the bottom 6 of the socket. Because of the construction described above and as can be seen clearly in the figures, the safety space 32 is particularly sheltered from external attack, particularly such as dust, ashes or even mechanical damage (clumsy use of a screwdriver, for example).

The cigar lighter according to the invention also includes at least one safety blade terminal 30 which extends within the safety space 32. The safety blade terminal 30 is thus placed between the safety contact 14 and the bottom 6 of the socket.

The safety blade terminal 30 is a bimetallic strip essentially perpendicular to the assembly direction and parallel to the main direction of the safety contact 14. The safety blade terminal 30 will therefore preferably be perpendicular to the main direction of the bimetallic strip. Advantageously, and as represented in FIG. 1, the safety blade terminal 30 is produced as one piece with the bimetallic strip 10.

In the event of overheating, the safety blade terminal 30 will be displaced towards the bottom 6 of the socket and will cause a short circuit, which will entail blowing of the fuse associated with the cigar lighter and thus removal of power from the cigar lighter.

The safety blade terminal 30 is linked to the bimetallic strip 10 by a portion 34 directed along the assembly direction. This portion 34 is limited at its ends by two bends, the first bend linking the said portion 34 to the bimetallic strip 10, the second bend linking the said portion 34 to the safety blade terminal 30. Hence the safety blade terminal 30 extends principally in a central region of the safety space 32. The movement of the safety blade terminal 30 which is necessary to cause a short circuit in the event of overheating could thus be limited.

It is interesting to note moreover that the distance d separating the safety blade terminal 30 from the bottom 6 of the socket is obtained by subtracting the extent e of the said portion 34 from the thickness E of the bimetallic strip holder separating the bottom 4 of the socket from the bimetallic strip 10 (d=E−e). However, E and e are tool ribs [sic] . The repeatability of the distance d will therefore be optimal, and all the more so as the said portion extends along the assembly direction.

The safety blade terminal 30 is particularly well protected from external attack, in the first place by the safety contact 14, but also by the bimetallic strip holder 8 and the socket 4, these three elements forming the safety space.

It will be noted moreover, by comparison with cigar lighters of the prior art, that the axial bulk along the assembly direction is very much reduced.

The cigar lighter preferably includes two symmetric safety blade terminals. The forming of the short circuit is thus ensured even in the event of failure of one of the safety blade terminals.

Bosses could equally be provided in the bottom 6 of the socket in order to facilitate the forming of the short circuit.

The preceding description, needless to say, represents only one embodiment of the invention which is not limited thereto.

What is claimed is:

1. A cigar lighter comprising:
   a lighting socket having a bimetallic strip disposed on an end portion of the lighting socket;
   a removable heating plug receivable in the lighting socket along an assembly direction;
   a safety blade terminal in electrical contact with the bimetallic strip, the safety blade terminal being electrically engageable with the socket in the event of overheating, and
   a safety contact disposed in the socket and extending substantially transversely to the assembly direction, the safety contact and the socket end portion defining a safety space between said safety contact and the socket end portion, the safety blade terminal extending into the safety space substantially transversely to the assembly direction.

2. A cigar lighter according to claim 1 wherein the safety contact is in electrical contact with the bimetallic strip.

3. A cigar lighter according to claim 1 wherein the safety blade terminal is integral with the bimetallic strip.

4. A cigar lighter according to claim 3, wherein the safety blade terminal is linked to the bimetallic strip by a portion directed along the assembly direction.

5. A cigar lighter according to claim 1, wherein a bimetallic strip holder is interposed between the end portion of the socket and the bimetallic strip and wherein the bimetallic strip holder exhibits at least one hollow space defined in part by a face of the bimetallic strip holder turned towards the end portion of the sock et and wherein the safety blade terminal is accommodated in the hollow space.

6. A cigar lighter according to claim 5, wherein the bimetallic strip holder includes, in a face opposite the end portion of the socket, at least one countersink, in which the safety contact is accommodated.

7. A cigar lighter according to claim 6, wherein the hollow space opens out into the countersink through an orifice and wherein the orifice is masked by the safety contact.

8. A cigar lighter according to claim 6 wherein the safety contact bears on the bimetallic strip holder along three axes.

9. A cigar lighter according to claim 1, wherein the safety contact is mounted by means of a fixing element which also couples the bimetallic strip, the safety blade terminal and the bimetallic strip holder onto the socket.

10. A cigar lighter according to claim 1, comprising two safety blade terminals.

\* \* \* \* \*